United States Patent
Hobson

(10) Patent No.: US 7,361,298 B2
(45) Date of Patent: Apr. 22, 2008

(54) METHOD AND APPARATUS FOR IN MOLD TRIMMING

(75) Inventor: Gerald R. Hobson, Shell Rock, IA (US)

(73) Assignee: Progressive Components International Corporation, Wauconda, IL (US)

( * ) Notice: Subject to any disclaimer, the term of this patent is extended or adjusted under 35 U.S.C. 154(b) by 742 days.

(21) Appl. No.: 10/804,315

(22) Filed: Mar. 19, 2004

(65) Prior Publication Data

US 2004/0173951 A1 Sep. 9, 2004

Related U.S. Application Data

(63) Continuation of application No. 09/764,716, filed on Jan. 18, 2001, now Pat. No. 6,719,554.

(51) Int. Cl.
*B29C 49/08* (2006.01)
(52) U.S. Cl. .................................................. 264/536
(58) Field of Classification Search ................. 264/536
See application file for complete search history.

(56) References Cited

U.S. PATENT DOCUMENTS 5,480,607 A 1/1996 Hobson
5,698,236 A 12/1997 Hobson
5,910,283 A 6/1999 Hobson

FOREIGN PATENT DOCUMENTS

JP 07-214652 * 8/1995

* cited by examiner

*Primary Examiner*—Suzanne E. McDowell
(74) *Attorney, Agent, or Firm*—Law Offices of Mark A. Hamill, P.C.

(57) ABSTRACT

A method of trimming blow-molded products while in the mold including the steps of placing a parison between a mold having two mold halves, moving the two mold halves together to form a cavity and enclose a portion of the parison, pressurizing the inside of the parison to produce a product and trimming a portion of the product while it is in the mold by applying a vacuum to those portions adjacent to a cutter and by then moving the cutter across the cavity and across the portion of the product to be cut. The mold halves are then separated and the product is removed therefrom. The apparatus for achieving this method includes a cutter slidably disposed in a first slot and having a slot plugging member slidably exposed in a second slot wherein the cutter and slot plugging member will prevent plastic from entering the first and second slots when the plastic product is being formed. After the plastic is formed, a vacuum is applied to portions of the product adjacent to the cutter. Then the cutter and slot plugging member can be actuated to cut through the product at the desired location.

5 Claims, 3 Drawing Sheets

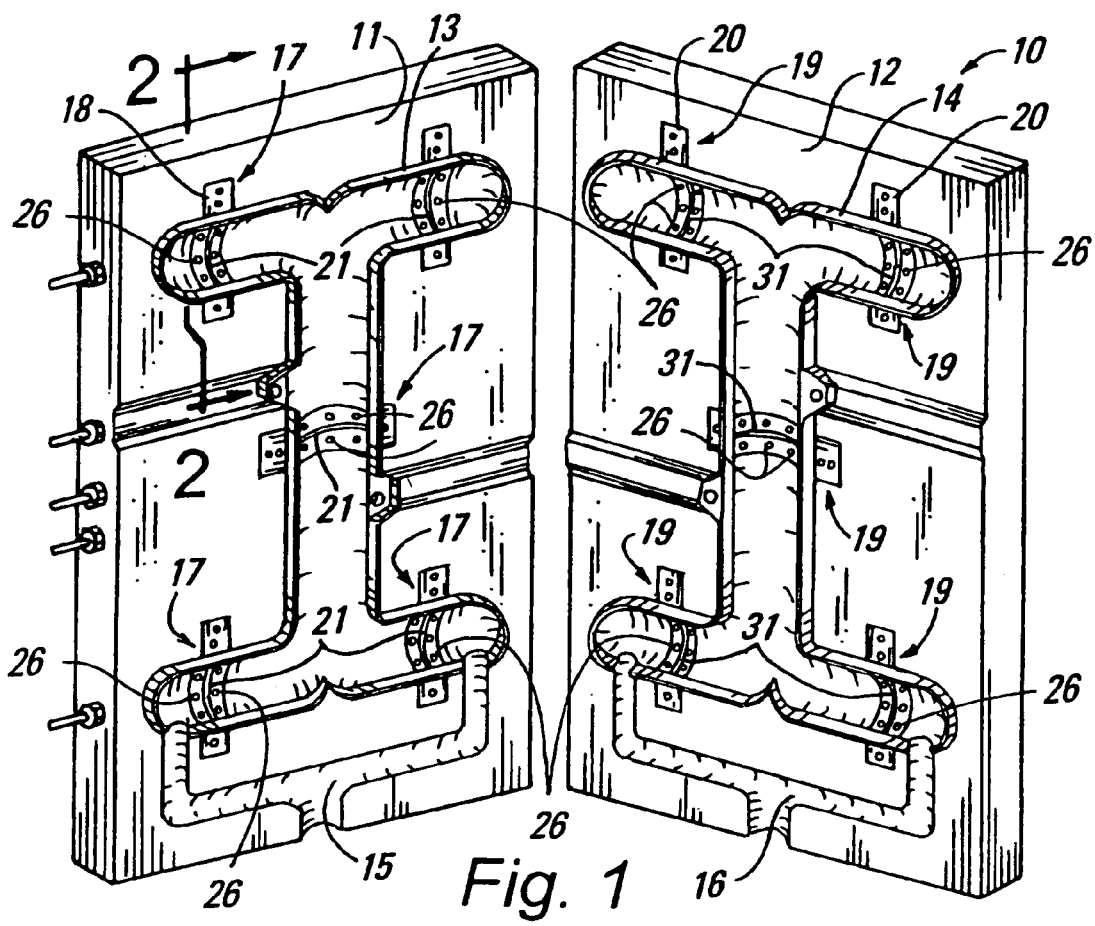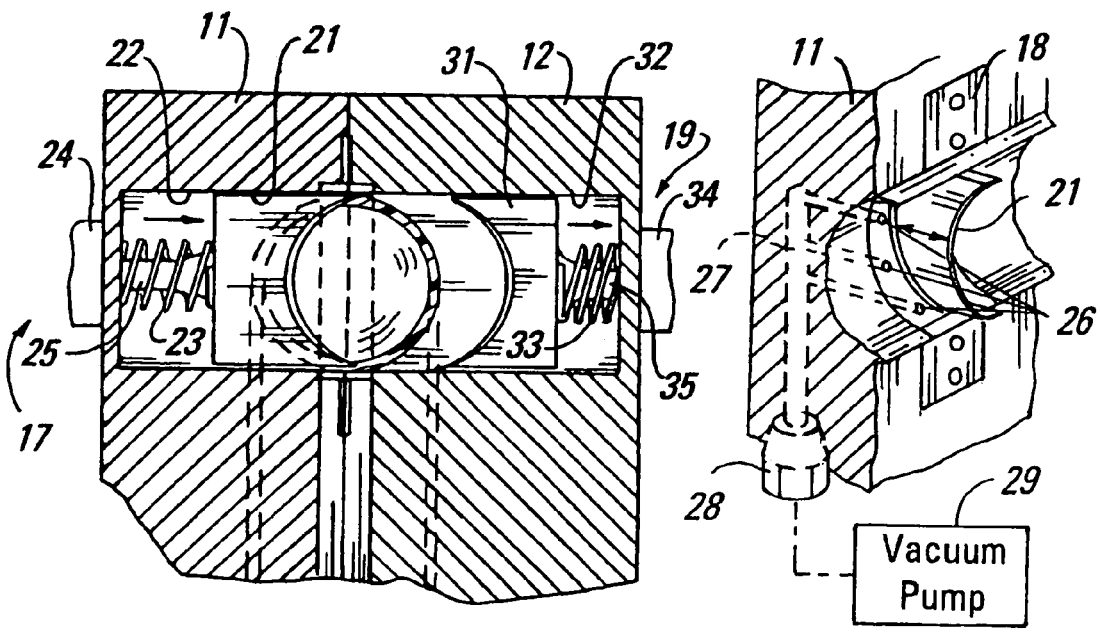

METHOD AND APPARATUS FOR IN MOLD TRIMMING

CROSS-REFERENCE TO RELATED APPLICATIONS

This application is a continuation of U.S. Ser. No. 09/764,716, now U.S. Pat. No. 6,719,554, filed Jan. 18, 2001.

STATEMENT REGARDING FEDERALLY SPONSORED RESEARCH OR DEVELOPMENT

Not Applicable

BACKGROUND OF THE INVENTION

1. Field of the Invention

This invention relates generally to a method and apparatus for trimming blow-molded parts and more particularly to such a method and apparatus where the trimming is achieved inside the mold to reduce and/or eliminate secondary trimming.

2. Background Art

Most blow molded products need to be trimmed after they are ejected from the mold. In some products, this trimming relates not only to the flash but also to other areas in a molded part. There is consequently a need to be able to reduce and/or eliminate as much of the trimming as possible. Such a reduction in the labor involved in trimming will also reduce injuries to workers, and will reduce the cost of secondary equipment.

This is an improvement on the invention of U.S. Pat. Nos. 5,698,236 and 5,910,283, which are incorporated herein by reference.

BRIEF SUMMARY OF THE INVENTION

The present invention relates to a method of trimming blow-molded products while in the mold including the steps of placing a parison between a mold having two mold halves, moving the two mold halves together to form a cavity and enclose a portion of the parison, pressurizing the inside of the parison to produce a product and trimming a portion of the product while it is in the mold by applying a vacuum to those portions adjacent to a cutter and by then moving the cutter across the cavity and across the portion of the product to be cut. The mold halves are then separated and the product is removed therefrom.

The apparatus for achieving this method includes a cutter slidably disposed in a first slot and having a slot plugging member slidably exposed in a second slot wherein the cutter and slot plugging member will prevent plastic from entering the first and second slots when the plastic product is being formed. After the plastic is formed, a vacuum is applied to portions of the product adjacent to the cutter. Then the cutter and slot plugging member can be actuated to cut through the product at the desired location.

An object of the present invention is to provide an improved method and apparatus for trimming blow-molded parts.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a perspective view of two mold halves showing the in mold trimming apparatus in a preferred embodiment thereof;

FIG. 2 is an enlarged cross-sectional view taken along line 2-2 of FIG. 1 and showing a cutting blade and one mold half and a slot plugging member in the other mold half, each being biased to a position to prevent plastic from creeping into the respective slots of the cutter and plug slot plugging member;

FIG. 3 is an enlarged perspective view of one of the cutters shown in an extended cutting position and showing vacuum parts in dashed lines;

DETAILED DESCRIPTION OF THE INVENTION

Figure 8:
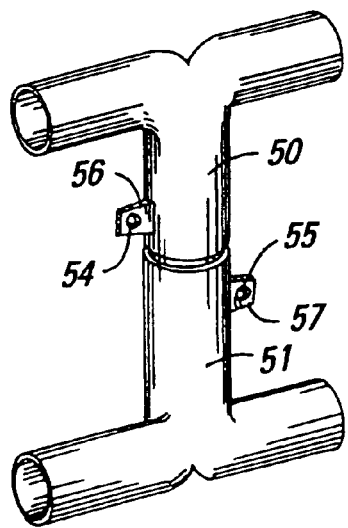
FIG. 8 shows the ultimate product being formed in pairs by use of the method and an apparatus of FIGS. 1-7.

Referring now to the drawings wherein like reference numerals designate identical or corresponding parts throughout the several views, FIG. 1 shows a molding and in mold trimming apparatus (10) constructed in accordance with the present invention. Mold halves (11 and 12) have cavity portions (13 and 14) connected thereto. Channels (15 and 16) form a passage way for air under pressure to pressurize the inside of a parison used to produce the product shown in FIG. 8.

Figure 4:
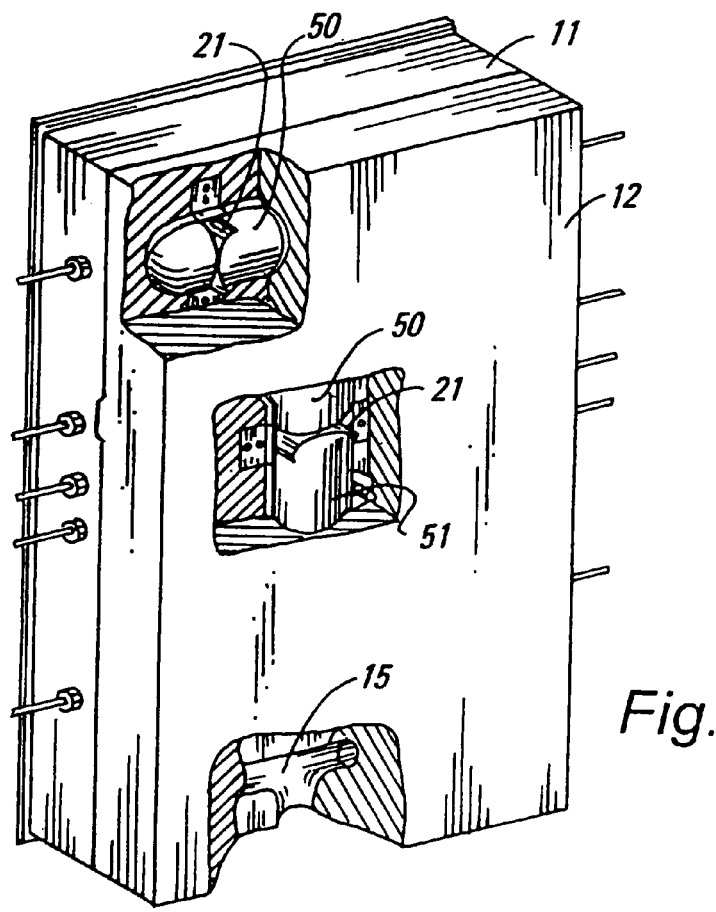
FIG. 4 is a perspective view of the present invention with the two mold halves together with a parison having been used to blow-mold a product and showing broken away sections of two of the cutters cutting the product and another cut-away section showing the air passage way leading to the inside of the parison and mold cavity.
Figures 5, 6:
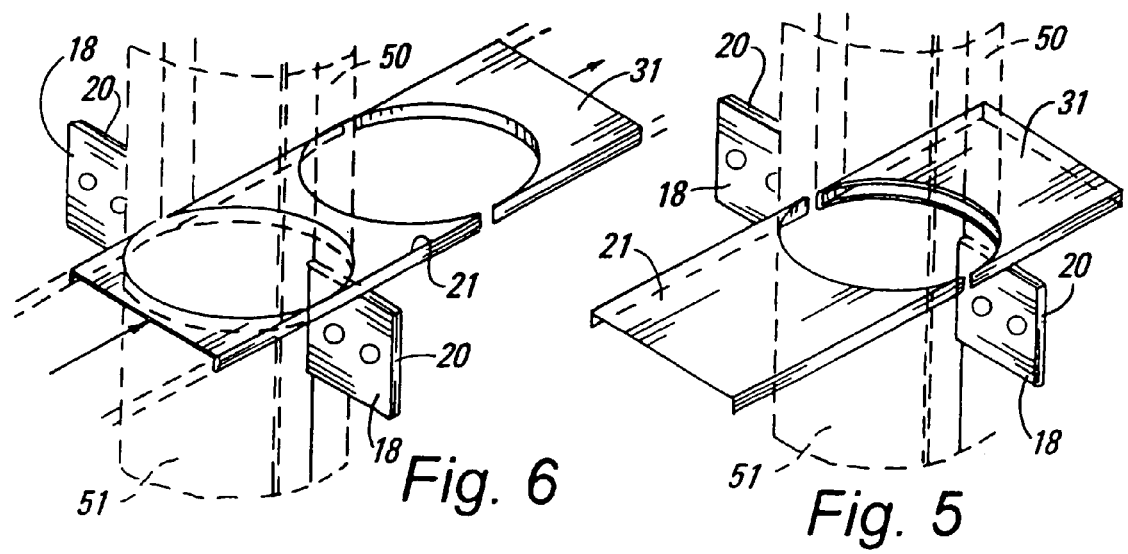
FIG. 5 is a view of the cutter and slot plugging member in the position to which it is biased to block flow of plastic out of the slots in which the cutter and slot plugging member reciprocate.
FIG. 6 is an enlarged perspective view of the cutter and slot plugging member of FIGS. 2 and 3 shown in a position of having already cut through the product in the center section thereof as shown in FIG. 4.

FIG. 2 shows a cutter assembly (17) associated with and connected to the half (11) by flange members (18). A slot blocking apparatus (19) is shown attached to the mold half (12) in FIG. 2 and is held in place by flanges (20). The cutter (21) slides in a slot (22) in mold half (11) and is biased to the position shown in dashed lines in FIG. 2, and shown right at the surface of the mold in FIG. 1, to block plastic from entering the slot (22) during the molding process. A spring (23) biases the cutter (21) to the slot blocking position shown in FIG. 1. It is operable to move the cutter (21) from the slot blocking position shown in FIGS. 1 and 5 to the cutting position shown in FIGS. 3, 4 and 6. Vacuum vent holes (26) are located in the guide flanges (18, 20). The number and size of the vent holes (26) is a function of the size of the mold.

In the molding process these vent holes (26) have vacuum applied to them when the cutter blade (21) is actuated. This allows the plastic to be held in positive contact with the mold surface providing the plastic part (50, 51) a smoother more symmetrical cut. As shown in FIG. 3, vent holes (26) connect to a channel (27). Channel (27) connects to port member (28) of a vacuum pump (29).

Similarly the slot (32) has slot blocking member (31) slidably disposed therein with a biasing spring (33) to bias the slot blocking member (31) to the position shown in FIG. 1 wherein plastic will not be allowed to enter the slot (32) during the molding process and an actuator (34) is utilized to move the slot blocking member (31) through a post (35). The actuators (24 and 34) can be mechanical, pneumatic, or electro-mechanical devices. Also, it is possible to merely use one actuator (24) and eliminate actuator (34) by allowing the blade (21) to push the slot blocking member (31) out of the way when the blade (21) is activated to the second position shown in FIGS. 3, 4 and 6. It is noted that while the blade (21) is flat throughout most of its length, the ends thereof are turned 90° to help in stabilizing the blade (21) and making it more rigid without adding bulk. Vent holes (26) are also used in conjunction with cutters (31).

Figure 7:
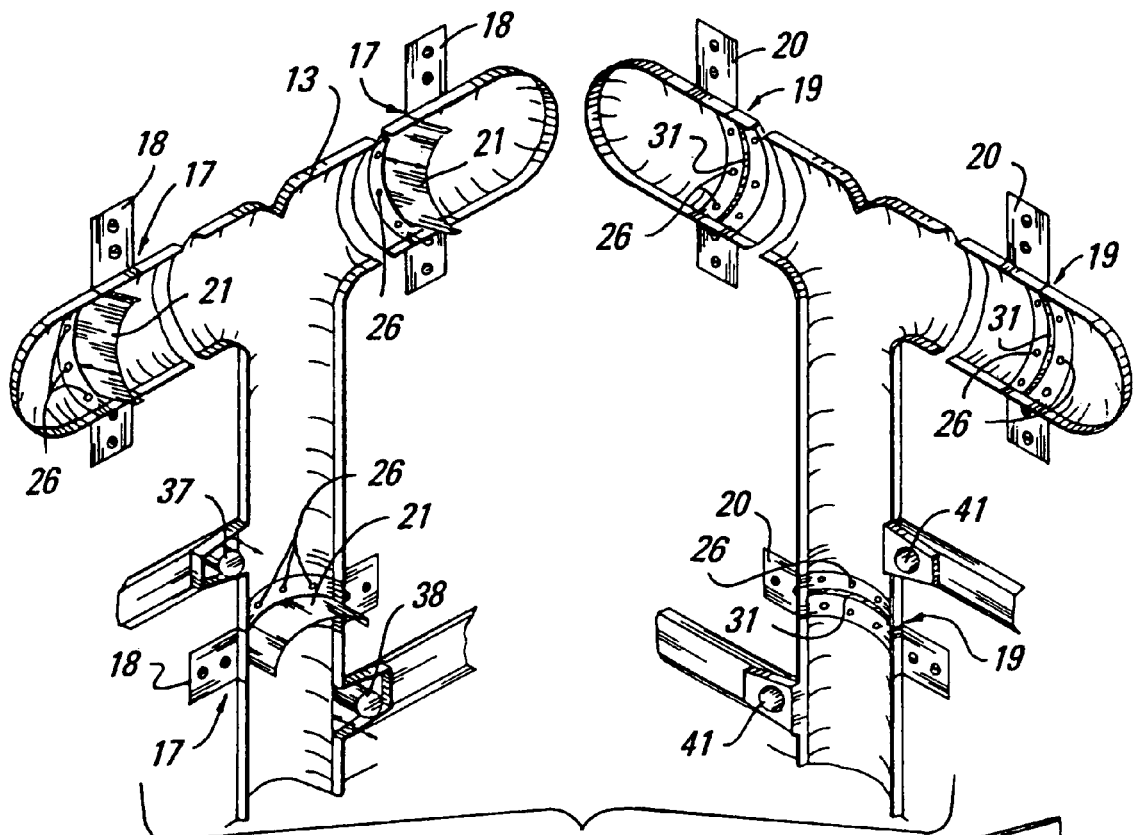
FIG. 7 is a perspective view of the cavity forming portions of the two mold halves and showing three of the six cutters which have been actuated and showing the two punches also actuated at the same time as the cutters.

Referring to FIG. 7, the cavity forming member (13) also has a punch (37 and 38) which are actuated in a manner identical to the actuators of the cutter shown in FIG. 2 and extend or punch simultaneously with the actuation of the cutters (17) which are all actuated simultaneously as are all of the slot blocking members (19) and punch hold blocking members (41), which are not shown in detail but operate in the same way as slot blocking members (31) shown in FIG. 2.

In operation, the mold halves (11 and 12) are positioned in the position shown in U.S. Pat. No. 5,480,607 to Hobson, which is incorporated herein by reference. This shows the standard way in which a blow-molding occurs, wherein the parison comes down between the two mold halves which are spaced apart, the mold halves then are pushed together, squeezing the parison around the mold cavity (13 and 14), at which time air under pressure is introduced through channels (15 and 16) to cause the parison to conform to the interior of the mold cavities (13 and 14).

Figure 9:
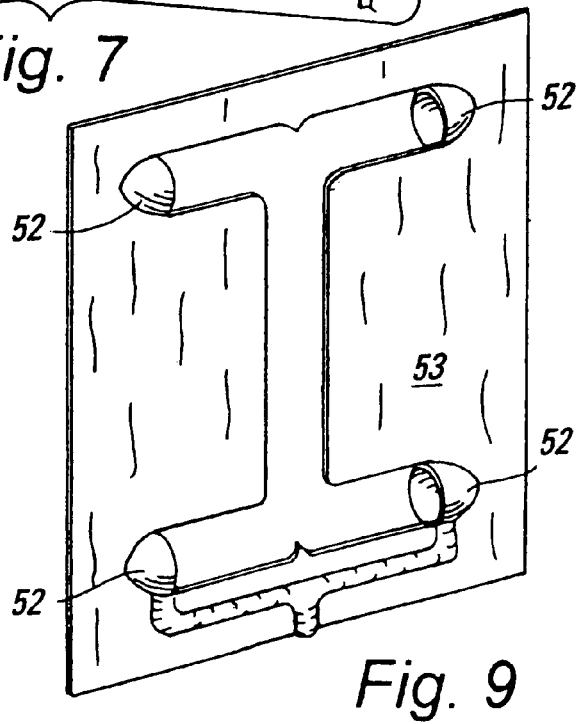
FIG. 9 shows the trimmed off flash portion of the parison, which can be recycled.

The trimming on the outside of the cavity, which is shown in FIG. 9, can be accomplished in the manner shown in the aforementioned Hobson patent, or in other ways if desired.

The five cutters (21) shown in FIG. 1 are used after the part is blow-molded in a conventional fashion. The knives (21) are actuated to the position shown in FIGS. 3, 4, 6 and 7 to cut the molded part (50 and 51) apart and cut the ends (52) off, which ends (52) stay connected to the flash (53) which is separated, for example, in the manner shown in the aforementioned Hobson patent. A vacuum is applied to all vacuum vents (25) during the cutting process to hold the plastic in place while the cutting occurs. At the same time that the knives (21) are actuated, the punches (37) punch holes (54 and 55) through flanges (56 and 57) on parts (50 and 51). Then the press opens the two mold halves (11 and 12) and the parts are ejected in a conventional fashion. The next molding cycle can then begin.

Accordingly, it will be appreciated that some of the features that can be trimmed in the mold are blow domes, transition between parts, neck openings, etc. It will also be appreciated that the preferred embodiment of the apparatus and method shown and disclosed does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of trimming blow molded products while in the mold, said method comprising:
    placing a parison between two mold halves of a mold;
    moving the two mold halves together to form a cavity defined by the interior of the two mold halves and a cutting portion of a cutter, said cutting portion of said cutter substantially conforming to the shape of the portion of the interior of one of the two mold halves adjacent to said cutting portion and enclosing a portion of the parison within said cavity when the two mold halves move together;
    blowing gas under pressure into the parison to expand the parison within said mold and thereby form a blow molded product;
    using a vacuum supplied by a plurality of vacuum vents with at least one of the plurality of vents located on a first side of the cutter and at least one of the plurality of vents located on a second side of the cutter to hold at least two portions of the product located adjacent to the first side of the cutter and the second side of the cutter, respectively, against the interior of the mold;
    trimming a portion of said product while it is in the mold and being held adjacent to both the first side of the cutter and the second side of the cutter by said vacuum by moving the cutter across and through the cavity and across the portion of the product to be cut;
    separating the mold halves; and
    removing the trimmed product from the mold.

2. The method of claim 1 wherein said gas is air.

3. The method of claim 1 wherein a slot plugging member conforming to the interior of the other mold half is moved when the cutter is moved across and through the cavity.

4. A method of trimming blow molded products while in the mold, said method comprising:
    placing a parison between two mold halves of a mold;
    moving the two mold halves together to form a cavity defined by the interior of the two mold halves and a cutting portion of a cutter, said cutting portion of said cutter substantially conforming to the shape of the portion of the interior of one of the two mold halves adjacent to said cutting portion and enclosing a portion of the parison within said cavity when the two mold halves move together;
    blowing gas under pressure into the parison to expand the parison within said mold and thereby form a blow molded product;
    using a vacuum supplied by a plurality of vacuum vents arranged around the interior periphery of the mold cavity adjacent to the cutter to hold at least a portion of the product against the interior periphery of the mold cavity at a plurality of spaced apart peripheral points adjacent to the cutter;
    trimming a portion of said product while it is in the mold and being held at the plurality of peripheral points adjacent to the cutter by said vacuum by moving the cutter across and through the cavity and across the portion of the product to be cut;
    separating the mold halves;
    and removing the trimmed product from the mold.

5. A method of trimming blow molded products while in the mold, said method comprising:
    placing a parison between two mold halves of a mold;
    moving the two mold halves together to form a cavity defined by the interior of the two mold halves and a cutting portion of a cutter, said cutting portion of said cutter substantially conforming to the shape of the portion of the interior of one of the two mold halves adjacent to said cutting portion and enclosing a portion of the parison within said cavity when the two mold halves move together;

blowing gas under pressure into the parison to expand the parison within said mold and thereby form a blow molded product;

using a vacuum supplied by a first and second array of vacuum vents arranged around the interior periphery of the mold cavity, the first array of vacuum vents being location adjacent to a first side of the cutter, and the second array of vacuum vents being located adjacent to a second side of the cutter, to hold at least a portion of the product at a plurality of spaced apart peripheral points adjacent to both the first side and second side of the cutter against the interior periphery of the mold cavity;

trimming a portion of said product while it is in the mold and being held by said by both the first and second array of vacuum vents by moving the cutter across and through the cavity and across the portion of the product to be cut;

separating the mold halves; and removing the trimmed product from the mold.

* * * * *